US008745966B2

(12) United States Patent
Metezeau et al.

(10) Patent No.: US 8,745,966 B2
(45) Date of Patent: Jun. 10, 2014

(54) MOBILE THRUST REVERSER COWL AND THRUST REVERSER PROVIDED WITH SUCH A COWL

(75) Inventors: Fabrice Metezeau, Montivilliers (FR); Laurent Valleroy, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 808 days.

(21) Appl. No.: 12/674,193

(22) PCT Filed: Jun. 20, 2008

(86) PCT No.: PCT/FR2008/000862
§ 371 (c)(1),
(2), (4) Date: Feb. 19, 2010

(87) PCT Pub. No.: WO2009/034240
PCT Pub. Date: Mar. 19, 2009

(65) Prior Publication Data
US 2011/0139897 A1    Jun. 16, 2011

(30) Foreign Application Priority Data

Aug. 20, 2007   (FR) ..................................... 07 05895

(51) Int. Cl.
*F02K 3/02*        (2006.01)
(52) U.S. Cl.
USPC ......................................................... 60/226.2
(58) Field of Classification Search
USPC ..................... 60/226.1–226.3, 262, 230, 798;
244/110 B, 12.5; 239/265.29, 265.31, 239/265.37
See application file for complete search history.

(56) References Cited

U.S. PATENT DOCUMENTS

| 4,564,160 | A | * | 1/1986 | Vermilye | ................ | 244/110 B |
| 5,927,647 | A |   | 7/1999 | Masters |   |   |
| 6,237,325 | B1 | * | 5/2001 | Hogie et al. | ................ | 60/226.2 |
| 2006/0005530 | A1 | * | 1/2006 | Blin et al. | ................ | 60/226.2 |

FOREIGN PATENT DOCUMENTS

WO        8401344 A1    4/1984

OTHER PUBLICATIONS

International Search Report PCT/FR2008/000862; Dated Feb. 5, 2009.

* cited by examiner

*Primary Examiner* — Phutthiwat Wongwian
(74) *Attorney, Agent, or Firm* — Brinks Gilson & Lione

(57) ABSTRACT

A mobile cowl for a cascade-type thrust reverser includes an interior wall having an anterior zone, a movably mounted shutter and a link rod of which one end is connected to the shutter to actuate the shutter from one position to other. One of the positions may be a direct-jet position in which the shutter is situated facing the anterior zone, and other position may be a reverse-jet position in which the shutter is situated away from the anterior zone. The interior wall has, in the anterior zone, a part able to allow the link rod end to move beyond a normal position in the event of abnormal movements of the link rod end, without wrecking the interior wall.

6 Claims, 1 Drawing Sheet

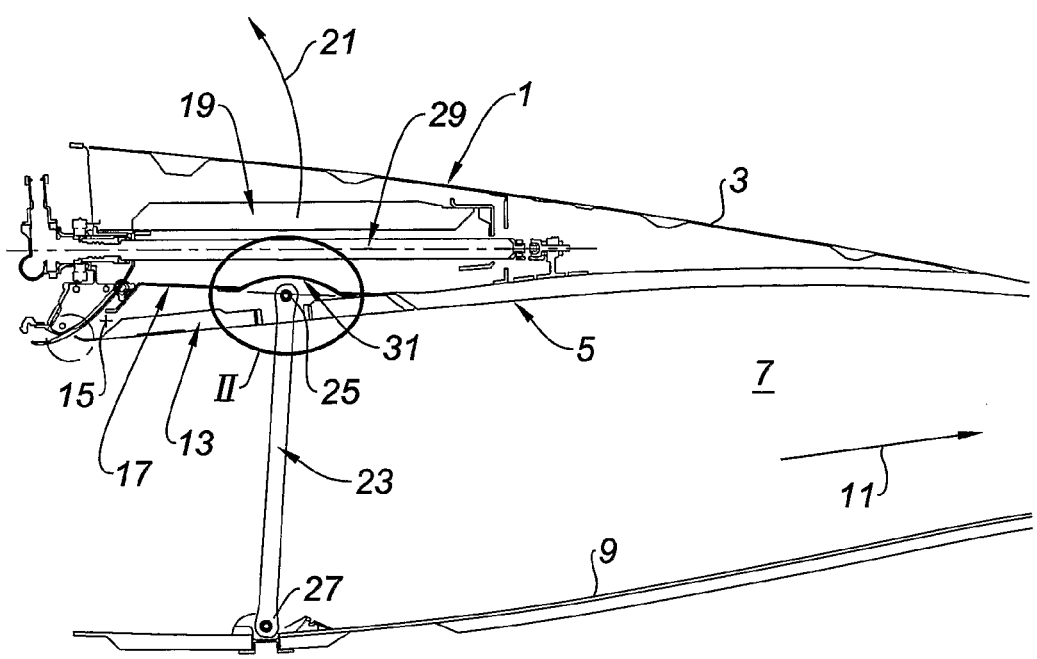

MOBILE THRUST REVERSER COWL AND THRUST REVERSER PROVIDED WITH SUCH A COWL

TECHNICAL FIELD

The present invention relates to a mobile thrust reverser cowl and to a thrust reverser equipped with such a mobile cowl.

BACKGROUND

The prior art already discloses a mobile cowl for a cascade-type thrust reverser, comprising:
- an interior wall having an anterior zone,
- at least one shutter mounted such that it is articulated between a direct-jet position in which this shutter is situated facing said anterior zone and a reverse-jet position in which this shutter is situated away from said anterior zone, and
- at least one link rod of which one end is connected to said shutter in order to actuate it from one of said positions to the other.

The other end of the link rod is intended to be connected to the inner fixed structure of the thrust reverser, and the switch of the shutter from one of its positions to the other is achieved under the effect of the sliding of the mobile cowl with respect to the fixed structure of the reverser.

When the shutter is in the direct-jet position, that end of the link rod that collaborates with the shutter lies very close to the anterior zone of the internal wall of the mobile cowl.

This forced proximity is accentuated in thrust reversers destined for large engines, in which attempts are made to minimize the radial thickness separating the shutter from the exterior wall of the mobile cowl.

Now, if an engine duct ruptures when the thrust reverser is in the direct-jet position, the link rod may undergo a certain outward movement, with the risk of puncturing the internal wall of the mobile cowl in the anterior region thereof and thus leading to disorder that is unacceptable in the face of the safety regulations in force.

The risk of such link rod movement also arises in particular navigational situations such as, for example, when the airplane is making a turn in flight, and when substantial pressure differences are experienced across the periphery of the external zone of the mobile cowls of the thrust reverser.

BRIEF SUMMARY

The invention provides a thrust reverser able to prevent the risk of wreckage inherent to the abnormal relative radial movements of the link rod in relation to the internal anterior wall of the mobile cowl.

The invention further provides a mobile cowl for a cascade-type thrust reverser, comprising:
- an interior wall having an anterior zone,
- at least one shutter mounted such that it is articulated between a direct-jet position in which this shutter is situated facing said anterior zone and a reverse-jet position in which this shutter is situated away from said anterior zone, and
- at least one link rod of which one end is connected to said shutter in order to actuate it from one of said positions to the other,
- notable in that said interior wall has, in said anterior zone, a part able to allow said link rod end to move beyond its normal position without wrecking said interior wall.

The presence of such a part makes it possible to control the effects of interference between the end of the link rod and the interior wall of the mobile cowl in the event of abnormal movements of this link rod end which have been brought about particularly by an exploding of an engine duct or by pressure differences in the thrust reverser fresh air flow path.

In other words, the effects of said interference are contained very locally, and this prevents these effects from spreading to the entire mobile cowl and potentially having serious consequences on the operation of the engine and therefore of the airplane as a whole.

According to other optional features of this mobile cowl:
- said part is fusible: in this case, the end of the link rod can pierce this part when this link rod moves radially beyond its normal position;
- said part is elastic: in this case, this part moves without becoming perforated under the effect of the movement of the link rod, making it possible to avoid leaks of fresh air flowing along the fresh air flow path;
- said part is domed towards the outside of said mobile cowl: this domed shape allows the end of the link rod to be made to encroach upon the volume delimited by the anterior zone of the internal wall of the mobile cowl in a normal operating situation, thus reducing the radial thickness of the assembly formed by the mobile cowl and its shutter;
- a radial clearance is provided between said link rod end and said part: this clearance makes it possible to avoid interference between the end of the link rod and this part in a normal operating situation.

The present invention also relates to a cascade-type thrust reverser, notable in that it comprises a mobile cowl in accordance with the foregoing.

According to one optional feature, this thrust reverser comprises a radial clearance between said part and the rear frame of said cascade vanes: this clearance makes it possible to prevent this part from butting against the rear frame of these cascade vanes when the mobile cowl slides into its open position.

BRIEF DESCRIPTION OF THE DRAWINGS

Other features and advantages of the invention will become apparent from the description which will follow and from studying the attached figures in which:

FIG. 1 is an axial section through a thrust reverser according to the invention, in the direct-jet position, and FIG. 2 is a detailed view of zone II of FIG. 1.

DETAILED DESCRIPTION

Reference is made to FIG. 1 which shows that the thrust reverser according to the invention comprises a mobile cowl 1 comprising an exterior wall 3 and an interior wall 5.

The interior wall 5, with a fixed interior wall 9, defines a cold air flow path 7.

In direct-jet operation, fresh air flows along inside the flow path 7 in the direction of the arrow 11.

As is known per se, a shutter 13 is mounted such that it is articulated on the mobile cowl 1 about an axle 15 between a direct-jet position visible in FIG. 1, in which this shutter 13 faces an anterior zone 17 of the interior wall 5 of the mobile cowl 1, and a reverse-jet position (not depicted), in which this shutter closes off the fresh air flow path 7, allowing the fresh air to be deflected through the cascades of vanes 19 of the thrust reverser, in the direction indicated by the arrow 21.

The shutter 13 is moved from its direct-jet position into its reverse-jet position under the effect of at least one link rod 23 of which one end 25 is mounted articulated on this shutter and the other end 27 is mounted articulated on the inner fixed structure 9.

The tensile force applied by the link rod 23 to the shutter 13 in order to move it from its direct-jet position to its reverse-jet position, is caused by the sliding of the mobile cowl 3 under the effect of at least one actuating cylinder 29, from its position visible in FIG. 1 to a position shifted to the right of the figure, in which position this mobile cowl uncovers the cascade vanes 19, allowing the jet of reversed fresh air 21 to leave.

As is particularly visible in FIG. 2, it will be noted that the anterior zone 17 of the interior wall 5 of the mobile cowl 1 has a part 31 which is domed towards the outside of the thrust reverser, that is to say toward the top of the sheet of attached drawings.

This domed part 31 is obtained by forming an orifice in the wall of the anterior zone 17 and by obstructing this orifice by adding in a domed part.

This domed part may be made of the same material as the remainder of the wall that forms the anterior zone 17 or may alternatively be made of a different material.

According to a first option, the domed part 31 may be formed of a fusible material, that is to say of a material capable of yielding under the pressure exerted by the end 25 of the link rod 23 when this link rod moves toward the outside of the thrust reverser from its position depicted in FIG. 1.

One way of achieving such a fusible part is to ensure that the central portion 33 of this part has less thickness by comparison with the peripheral portion 35 thereof.

In another option, it may be conceivable for the part 31 to be made of an elastic material, that is to say of a material that does not yield under the effect of an outward radial movement of the link rod 23.

When the domed part 31 is fusible, it may be formed, for example, of metal alloy or composite.

When this domed part is elastic, it may be made, for example, from a suitable polymer.

Of course, a radial clearance J1 is provided between the end 25 of the link rod 23 and the end wall of the domed part 31, so that in the normal mode of operation, this link rod end does not interfere with this domed part 31.

A radial clearance J2 is also provided between the end wall of the domed part 31 and the rear frame 37 of the cascade vanes 19, so that when the mobile cowl 1 slides from its direct-jet position into its reverse-jet position, this part 31 does not interfere with this cascade vanes rear frame.

The advantages of the thrust reverser which has just been described are immediately obvious from the above considerations.

The fact that there is a fusible or elastic part 31 allows the link rod to puncture the part 31 (when this part is fusible) or to move this part 31 toward the outside of the thrust reverser (when this part 31 is elastic) if there is any excessive radial movement of this link rod 23 toward the outside of the thrust reverser in a direct-jet configuration as depicted in FIG. 1, without wrecking the wall that forms the interior zone 17 of the mobile cowl 1.

In other words, destruction or localized deformation of this wall is permitted, making it possible to prevent the interior wall 5 of the mobile cowl, or even the entirety of this mobile cowl and therefore of the thrust reverser, from becoming completely wrecked.

Of course, the present invention is not in any way restricted to the embodiments described and depicted, which have been provided solely by way of example.

Thus, for example, instead of a domed part 31, it might be possible to provide a simple cover extending substantially in the plane of the wall of the anterior zone 17.

However, it should be noted that such an option would be less advantageous than the one described hereinabove.

Specifically, the option described hereinabove makes it possible, because of the encroachment of the link rod 23 into the space delimited by the wall of the interior zone 17, to obtain a lesser overall radial thickness of the mobile cowl 1 and of its shutter 13, something which is of particular benefit in thrust reversers intended for large engines in which radial size is a critical consideration.

The invention claimed is:

1. A mobile cowl for a cascade type thrust reverser, the mobile cowl comprising:
    an interior wall having an anterior zone and defining a cold air flow path with a fixed interior wall;
    at least one shutter mounted such that the shutter is articulated between a direct-jet position in which the shutter is situated facing said anterior zone and a reverse-jet position in which the shutter is situated away from said anterior zone; and
    at least one link rod of which one end is connected to said shutter in order to actuate the shutter from one of said positions to the other,
    wherein said interior wall has, in said anterior zone, a part having an exterior surface connected to an inner surface of the interior wall and forms a radial clearance with the link rod able to allow said link rod end to radially move toward an outside of the thrust reverser without wrecking said interior wall in the event of abnormal movements of said link rod end which have been brought on by at least one of an explosion of an engine duct and pressure differences in the thrust reverser cold air flow path.

2. The cowl as claimed in claim 1, wherein said part is fusible.

3. The cowl as claimed in claim 1, wherein said part is elastic.

4. The cowl as claimed in claim 1, wherein said part is domed toward an outside of said mobile cowl.

5. A cascade type thrust reverser, comprising a mobile cowl as claimed in claim 1.

6. The thrust reverser as claimed in claim 5, further comprising a radial clearance between said part and a rear frame of cascade vanes.

* * * * *